(12) United States Patent
Thyagarajan

(10) Patent No.: US 10,962,683 B2
(45) Date of Patent: Mar. 30, 2021

(54) RECONFIGURABLE META-MATERIAL SYSTEMS

(71) Applicant: Palo Alto Research Center Incorporated, Palo Alto, CA (US)

(72) Inventor: Krishnan Thyagarajan, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 178 days.

(21) Appl. No.: 16/237,457

(22) Filed: Dec. 31, 2018

(65) Prior Publication Data

US 2020/0209432 A1    Jul. 2, 2020

(51) Int. Cl.
| | | |
|---|---|---|
| *G02B 1/00* | (2006.01) | |
| *F28F 13/18* | (2006.01) | |
| *C09D 4/00* | (2006.01) | |
| *C08J 7/04* | (2020.01) | |
| *G02B 1/10* | (2015.01) | |

(52) U.S. Cl.
CPC ............... *G02B 1/002* (2013.01); *C08J 7/04* (2013.01); *C09D 4/00* (2013.01); *F28F 13/185* (2013.01); *G02B 1/10* (2013.01); *F28F 2245/06* (2013.01)

(58) Field of Classification Search
CPC ......... G02B 1/002; G02B 1/10; F28F 13/185; F28F 2245/06; C09D 4/00; C08J 7/04
USPC ......................................................... 359/240
See application file for complete search history.

(56) References Cited

U.S. PATENT DOCUMENTS

2013/0061605 A1\*  3/2013  de Rochemont ....... H01L 35/04
62/3.5
2013/0342898 A1\*  12/2013  Alvine ..................... G02B 1/10
359/350

\* cited by examiner

*Primary Examiner* — Mohammed A Hasan
(74) *Attorney, Agent, or Firm* — Shun Yao; Park, Vaughan, Fleming & Dowler LLP

(57) ABSTRACT

One embodiment can provide a meta-material system. The meta-material system can include a host system and an inclusion system embedded within the host system. At least one effective physical property of the meta-material system is modulated by an external stimulation, thereby facilitating the meta-material system to self-regulating an external perturbation.

19 Claims, 15 Drawing Sheets

(11 of 15 Drawing Sheet(s) Filed in Color)

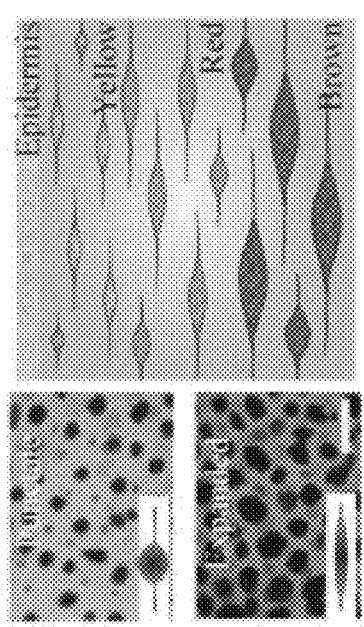
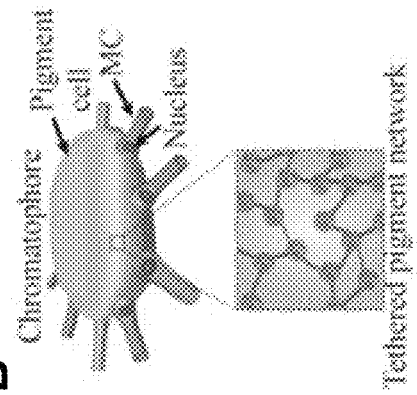
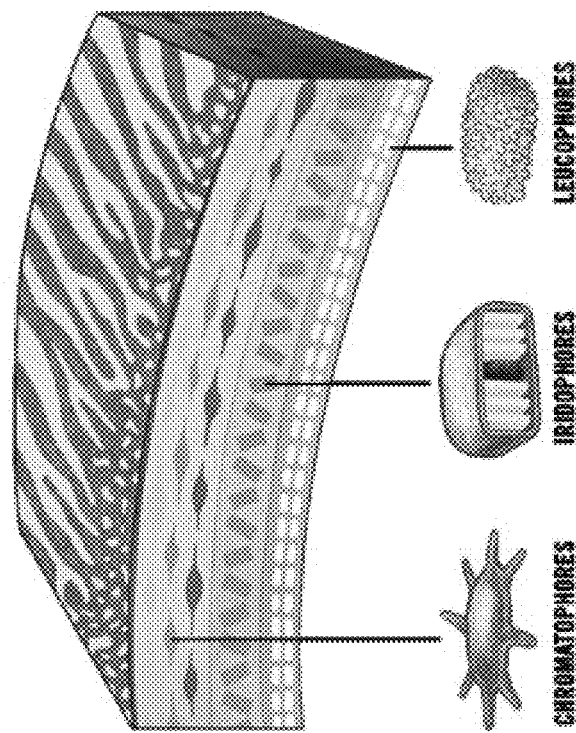
FIG. 1B
FIG. 1C
FIG. 1A

RECONFIGURABLE META-MATERIAL SYSTEMS

BACKGROUND

Field

This disclosure is generally related to meta-material systems. More specifically, this disclosure is related to self-adjusting meta-material systems.

Related Art

Coatings applied onto surfaces of physical objects have shown to be able to affect the conditions of those physical objects. For example, highly reflective coatings deposited onto the internal walls of thermoses can improve the insulation and black coatings deposited onto solar-powered heaters can improve the efficiency of the heater. However, the physical properties (e.g., optical properties) of those coatings have been predetermined, resulting in their limited application.

SUMMARY

One embodiment can provide a meta-material system. The meta-material system can include a host system and an inclusion system embedded within the host system. At least one effective physical property of the meta-material system is modulated by an external stimulation, thereby facilitating the meta-material system to self-regulating an external perturbation.

In a variation on this embodiment, the aforementioned at least one effective physical property can include one or more of: an optical property, a mechanical property, a thermal property, an acoustic property, a magnetic property, and an electrical property.

In a variation on this embodiment, the inclusion system can be embedded in the host system in a layered form or in a form of microparticles or nanoparticles.

In a variation on this embodiment, the external stimulation can include one or more of: a thermal modulation, an electrical modulation, a magnetic modulation, an acoustic modulation, a hydrophobic or hygroscopic modulation, and a pH-driven modulation.

In a variation on this embodiment, the host system can include one or more of: a dielectric material, a metallic material, and a polymeric material.

In a variation on this embodiment, the external stimulation changes at least a fill factor of the inclusion system within the host system.

One embodiment can provide an optical coating that has temperature-dependent optical properties. The optical coating can include a substrate having a first coefficient of thermal expansion (CTE) and a plurality of nanoparticles/microparticles embedded within the substrate. The nanoparticles/microparticles have a second CTE, and the second CTE is different from the first CTE in such a way that a change in temperature results in a change of a fill factor of the nanoparticles, thereby facilitating changes in the optical properties of the optical coating.

In a variation on this embodiment, the substrate can include a dielectric polymer.

In a further variation, the substrate can include one or more of: an SU8 polymer, a polyvinylidene fluoride (PVDF) polymer, a polyethylene (PE) polymer, and a polytetrafluoroethylene (PTFE) polymer.

In a further variation, the nanoparticles/microparticles can include metallic nanoparticles.

In a further variation, the nanoparticles/microparticles are made of one or more materials selected from a group consisting of: cobalt, palladium, aluminum, tungsten, titanium, chromium, copper, gold, silver, iron, niobium, and tin.

In a variation on this embodiment, a thickness of the substrate is between 100 and 5000 nm.

In a variation on this embodiment, at least one dimension of the nanoparticles/microparticles is between 10 and 500 nm.

In a variation on this embodiment, the fill factor of the nanoparticles/microparticles can be between 10% and 80%.

In a variation on this embodiment, the optical properties can include at least one of: an optical reflection spectrum, an optical transmission spectrum, and an optical absorption spectrum.

One embodiment can provide a self-adjusting temperature-control system. The system can include a physical object and an optical coating covering at least one surface of the physical object. The optical coating has temperature-dependent optical properties. The optical coating can include a substrate having a first coefficient of thermal expansion (CTE) and a plurality of nanoparticles/microparticles embedded within the substrate. The nanoparticles/microparticles have a second CTE, and the second CTE is different from the first CTE in such a way that a change in temperature results in a change of a fill factor of the nanoparticles/microparticles, thereby facilitating changes in the optical properties of the optical coating.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIGS. 1A-1C illustrate the basic concept of the tunable optical filter found in nature.

In the figures, like reference numerals refer to the same figure elements.

DETAILED DESCRIPTION

Figure 2:
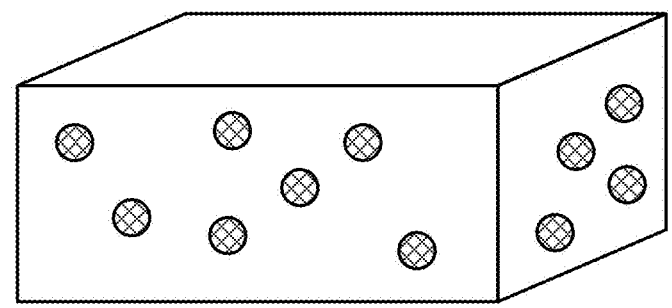
FIG. 2 illustrates exemplary meta-material systems, according to one embodiment.
Figure 2:
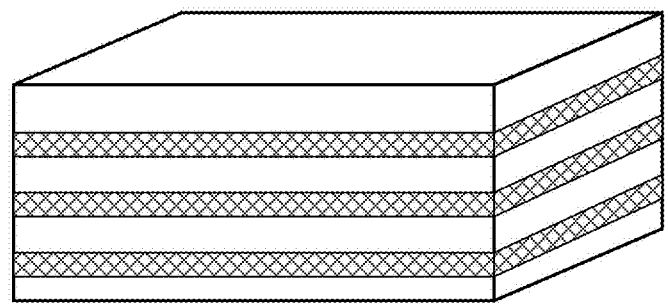
Figure 2:
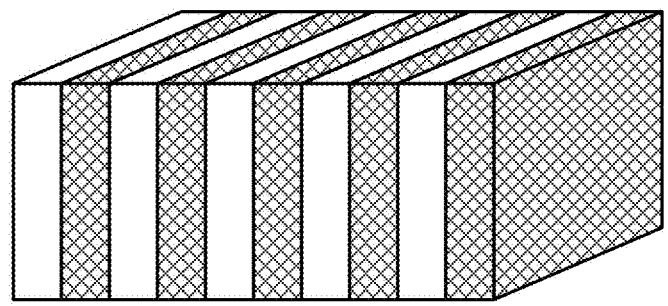

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the technical problem of providing a reconfigurable meta-material system. More specifically, the meta-material system can include a host system and an inclusion system embedded in the host system. The meta-material system can be self-regulating with respect to an external perturbation. In one embodiment, temperature-dependent self-adjusting optical coatings can be used to achieve low-cost temperature control. More specifically, a thin film fabricated by embedding nanoparticles having a certain thermal-expansion coefficient into a substrate having a different thermal-expansion coefficient can have temperature-dependent self-adjusting optical properties. By carefully choosing the materials that form the nanoparticles and the substrate, the optical properties (e.g., transmission spectrum) of the thin film can depend on temperatures in such a way that the thin film can absorb more infrared light at low temperature and reflect more infrared light at high temperature, thus providing low-cost temperature control.

Self-Adjusting Meta-Material Systems

Nature has provided ample examples of systems that have self-adjusting physical properties, such as thermal or optical properties. For example, many land-based reptiles have the ability to adjust their body temperature according to temperatures of the environment. Although pigmentary in nature, many of them share the common concept of the exposure of certain organic structures on the epithelial surface that reflect or transmit certain wavelengths of the incident radiation. Interestingly, cephalopods in the ocean apply similar techniques for a different purpose, namely communication or camouflage. The basic principle used by cephalopods consists of punctuating or expanding a collection of pigments at will, such that they act as tunable optical filters to filter light reflected by lower layers of the skin. FIGS. 1A-1C illustrate the basic concept of the tunable optical filter found in nature.

More specifically, FIG. 1A shows the overall skin structure of a cuttlefish. The cuttlefish's skin has three layers of specialized skin cells that work together to shift the cuttlefish's colors and patterns instantly, including chromatophores, iridophores, and leucophores. The chromatophores are in the top layer and can act as optical filters. On the other hand, the iridophores in the middle layer and leucophores in the lower layer can create iridescence and ambient light reflections. FIG. 1B shows the punctuated (upper left drawing) and expanded (lower left drawing) pigment sacks. The right drawing of FIG. 1B shows the cross-section of the skin. More specifically, the cross-section shows the layers of the three types of chromatophores (i.e., yellow, red, and brown). When the cuttlefish actuates its coloration system, each chromatophore expands; the surface area can change as much as 500 percent. Within the chromatophore, tethered pigment granules regulate light through absorbance, reflection, and fluorescence, in effect functioning as nanoscale photonic elements, even as the chromatophore changes in size. FIG. 1C shows the tethered pigment network within the chromatophore.

Inspired by such examples in nature, in some embodiments, a meta-material system having self-adjusting physical properties can be developed. In general, a meta-material system can include a host system and an inclusion system typically embedded within the host system. For example, the host system can be a substrate, whereas the inclusion system can be microparticles or nanoparticles embedded in the substrate. The host system and the inclusion system can have different physical properties, which can include but are limited to: optical properties, mechanical properties, thermal properties, acoustic properties, magnetic properties, electrical properties, etc. The effective physical properties of the meta-material system can be determined by the physical properties of both the host and inclusion systems.

The meta-material system can be considered self-adjusting or self-regulating when the configuration (e.g., the ratio between the host and the inclusion, the geometric arrangement of the host and the inclusion, or the way the host and the inclusion interacting with each other) of the meta-material system can be changed or modulated by an externally driven mechanism. The changed configuration of the meta-material system can result in changes in the effective physical properties of the meta-material system, thus causing an externally driven perturbation to be mitigated or augmented. For example, an externally driven mechanism, such as temperature change, can change the optical property (e.g., reflectivity) of a meta-material system, and an externally driven perturbation can be radiation, whose effect can be augmented or mitigated by the change in the reflectivity of the meta-material system. Other examples of externally driven mechanism can include, but are not limited to: optical mechanism (e.g., light excitation), mechanical mechanism (e.g., by applying forces), acoustic mechanism (e.g., sound excitation), magnetic mechanism (e.g., by applying magnetic field), electrical mechanism (e.g., by applying magnetic field), etc.

Changes in the optical properties can include changes of various optical factors, including but not limited to: changes in the refractive index, changes in the dielectric constant, changes in the absorption losses, the random media scattering, the grating effects, changes in the birefringence, changes in the color, the electro-optic effect, changes in the luminosity, changes in the optical activity, changes in the photoelasticity, etc. A self-regulating meta-material system can be used in various types of optical element (2D or 3D), including but not limited to: lenses, mirrors, beam-splitters, tunable resonators, couplers, and waveguides.

Changes in the mechanical properties of the meta-material system can include changes in various material properties, including but not limited to: the Young's modulus, the brittleness, the bulk modulus, the coefficient of restitution, the compressive strength, the ductility, the durability, the elasticity, the fatigue limit, the flexibility, the flexural strength and modulus, the fracture toughness, the malleability, the hardness, the plasticity, the Poisson's ratio, the shear modules and strength, the slip, the stiffness, the surface roughness, the toughness, and the viscosity. An exemplary application of a meta-material system having self-adjusting mechanical properties can include a system having a dynamically reconfigurable surface hydrophobicity, which can be configured via a change in the contact angle of liquids on surface.

Changes in thermal properties can include changes in various material properties, including but not limited to: the coefficient of thermal expansion, the critical temperature, the emissivity, the eutectic point, the flammability, the flash point, the glass transition temperature, the heat of vaporization, the inversion temperature, the melting point, the thermal conductivity, and the thermal diffusivity. An exemplary application of a meta-material system having self-adjusting thermal properties can include dynamically tunable thermal barrier coatings. Such coatings can allow heat to exit the room and cool down, or allow heat to enter the room and warm up.

Changes in acoustic properties can include changes in various material properties, including but not limited to: the acoustical absorption, the speed of sound, the sound reflection, and the acoustoelastic effect. An exemplary application of a meta-material system having self-adjusting acoustic properties can include a meta-material system capable of changing the soundproof properties of a given room or cabinet that houses highly sensitive equipment.

Changes in magnetic properties can include changes in various material properties, including but not limited to: the hysteresis, the magnetostriction, the magnetocaloric effect, the magnetothermoelectric effect, the magnetoresistance, the permeability, the piezomagnetism, and the pyromagnetic effect. An exemplary application of a meta-material system having self-adjusting magnetic properties can include a meta-material system used in smart sensors for measuring change in temperature or force.

Changes in electrical properties can include changes of various material coefficients, including but not limited to: the capacitance, the resistance, the inductance, the dielectric constant, the conductivity, the dielectric strength, the electrocaloric coefficient, the electrostriction, the magnetoelectric polarizability, the thermoelectric effect, the permittivity, the pyroelectric coefficient, and the Seebeck coefficient. A meta-material system having self-adjusting electrical properties can find application in dynamically reconfigurable volatile and non-volatile memory systems.

The host system can be in a bulk form and can include dielectric, metallic and polymeric materials. The host system can also include shape-memory polymers and superabsorbent polymers. The inclusion system can be in a layered form, a form of microparticles, a form of nanoparticles, etc. The host and inclusion system can also form an interdigitated pattern. The inclusion system can include various types of material, such as chemical polymers, chemical molecules, metallic, dielectric, alloys, or combinations thereof.

FIG. 2 illustrates exemplary meta-material systems, according to one embodiment. More specifically, the top drawing shows that the inclusion system (crosshatched regions) is embedded in the host system as particles, which can be microparticles or nanoparticles depending on the size. The middle drawing shows that the inclusion system (crosshatched regions) is embedded in the host system as thin layers. The bottom drawing shows that the inclusion system (crosshatched regions) and the host system form an interdigitated pattern.

Various types of externally driven mechanism can be used to modulate the physical properties of the meta-material system, including but not limited to: thermal modulations, electrical modulations, magnetic modulations, acoustic modulations, hydrophobic/hygroscopic modulations, and pH-driven modulations. In general, the externally driven mechanism can includes any technique that can dynamically change the relative fill fraction or the geometric arrangement of the host and inclusion systems, either spatially, or temporally, or spatiotemporally.

Optical Film with Embedded Nanoparticles

On example of the reconfigurable meta-material system can be a meta-material optical coating with self-adjusting optical properties. In recent years, various research efforts in the field of active light-matter interaction have proposed solutions for tunable meta-material systems that permit on-demand modulation of optical properties of a given structure. For example, active nanophotonic systems have been pursued for the potential roles they play in the next-generation photonic chips, novel meta-surfaces for ultra-thin optical components and optical displays. Examples of tuning mechanisms can include: field-effect in semiconductors (e.g., GaAs, Si, and Indium-tin-oxide), orientation of liquid crystal molecules, thermo-optical effect in silicon, graphene Fermi-level gating, phase-change materials, etc. However, most of these tuning mechanisms require impractical tuning conditions, such as high voltage or high temperature, are too slow, and are not self-adjusting. It is desirable to find a solution for a meta-material system that has self-adjusting optical properties.

Figure 3A:
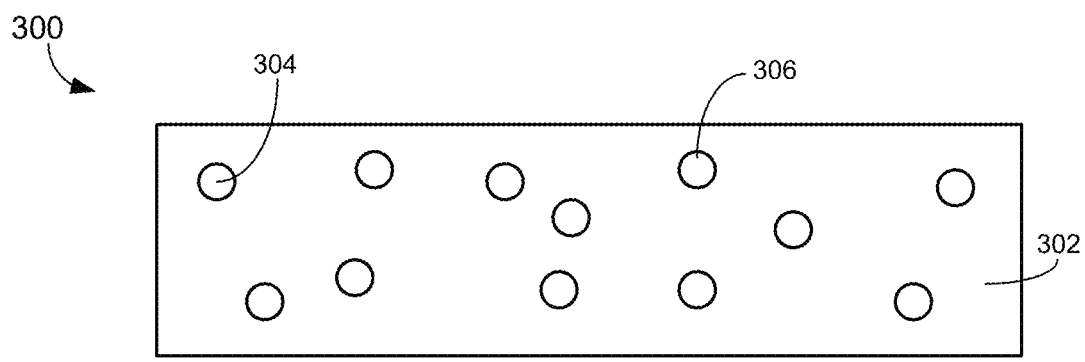
FIG. 3A shows an exemplary optical film with self-adjusting properties, according to one embodiment.

In some embodiments, the meta-material system with self-adjusting optical properties can be in the form of a thin film, and can include a substrate (which forms the host system) and nanoparticles/microparticles (which form the inclusion system) embedded in the substrate. FIG. 3A shows an exemplary optical film with self-adjusting properties, according to one embodiment. Optical film 300 can include a substrate 302 and a plurality of nanoparticles (e.g., nanoparticles 304 and 306) embedded inside substrate 302.

Substrate 302 can be made of dielectric or conductive materials. In some embodiments, substrate 302 can be made of a dielectric polymer having a relatively high thermal coefficient of expansion. In other words, when the temperature of the environment changes, the volume of substrate 302 can change significantly. Examples of dielectric polymer can include but are not limited to: SU8 polymer, polyvinylidene fluoride (PVDF) polymer, polyethylene (PE) polymer, and polytetrafluoroethylene (PTFE) polymer. In addition to common polymer with a positive CTE, in some embodiments, substrate 302 can include polymers with a negative CTE, such as a polyarylamide film that contains s-dibenzocyclooctadiene (DBCOD) and crystalline polymers. Substrate 302 can also include shape-memory polymers or superabsorbent polymers.

The thickness of substrate 302 can be selected based at least on the desired wavelength ranges of the transmission or reflection spectrum. In some embodiments, the thickness of substrate 302 can be between 50 nm and a few (e.g., less than 10) micrometers. In some embodiments, the thickness of substrate 302 can be between 100 nm and 5000 nm.

Figure 3B:
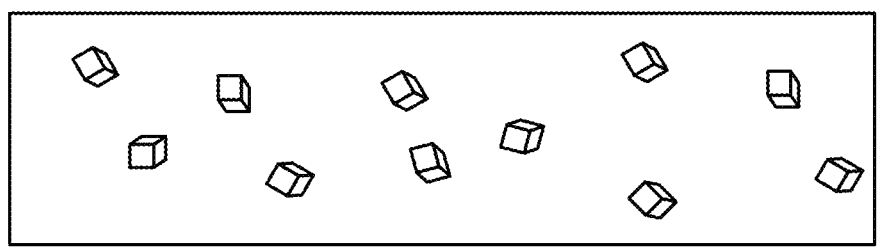
FIG. 3B shows an exemplary optical film embedded with cube-shaped particles, according to one embodiment.

Embedded nanoparticles (e.g., nanoparticles 304 and 306) can be made of dielectric or conductive materials. In some embodiments, these embedded nanoparticles can be made of metallic materials, including but not limited to: cobalt, palladium, aluminum, tungsten, titanium, chromium, copper, gold, silver, iron, niobium, and tin. The embedded particles can have various shapes, including but not limited to: sphere, polyhedron (e.g., triangle, cube, prism, pyramid), cylinder, etc. In some embodiments, the embedded particles are spheres, as shown in FIG. 3A. Alternative shapes are also possible. FIG. 3B shows an exemplary optical film embedded with cube-shaped particles, according to one embodiment. In addition to embedding nanoparticles of similar shapes, it is also possible to have nanoparticles of different shapes mixed together and embedded in the same substrate. For simplicity, many simulations included in this disclosure assume that the nanoparticles are spheres.

The size of the embedded particles can be determined based on the application or the desired wavelength ranges of the transmission or reflection spectrum. In some embodiments, the nanoparticles can have a dimension of between a few tens and a few hundreds of nanometers (e.g., between 10 and 500 nm, preferably between 10 and 100 nm). For example, for spherical nanoparticles, their diameters can be between 10 and 500 nm. In some embodiments, the sizes of embedded particles may be randomly distributed. For example, the diameters of the spherical nanoparticles embedded in a substrate can be normally distributed with a mean of 70 nm and a standard deviation of 5 nm.

The embedded nanoparticles can be randomly dispersed within the substrate. A fill factor can be defined as the ratio of the total volume of the embedded nanoparticles and the total volume of the film, which includes both the substrate and the nanoparticles. For example, a 100% fill factor means that only nanoparticles are present, whereas a 0% fill factor means that there are no nanoparticles. In some embodiments, the fill factor of an optical film at room temperature (e.g., 20° C.) can be between 10% and 80%, depending on the application.

Figure 4A:
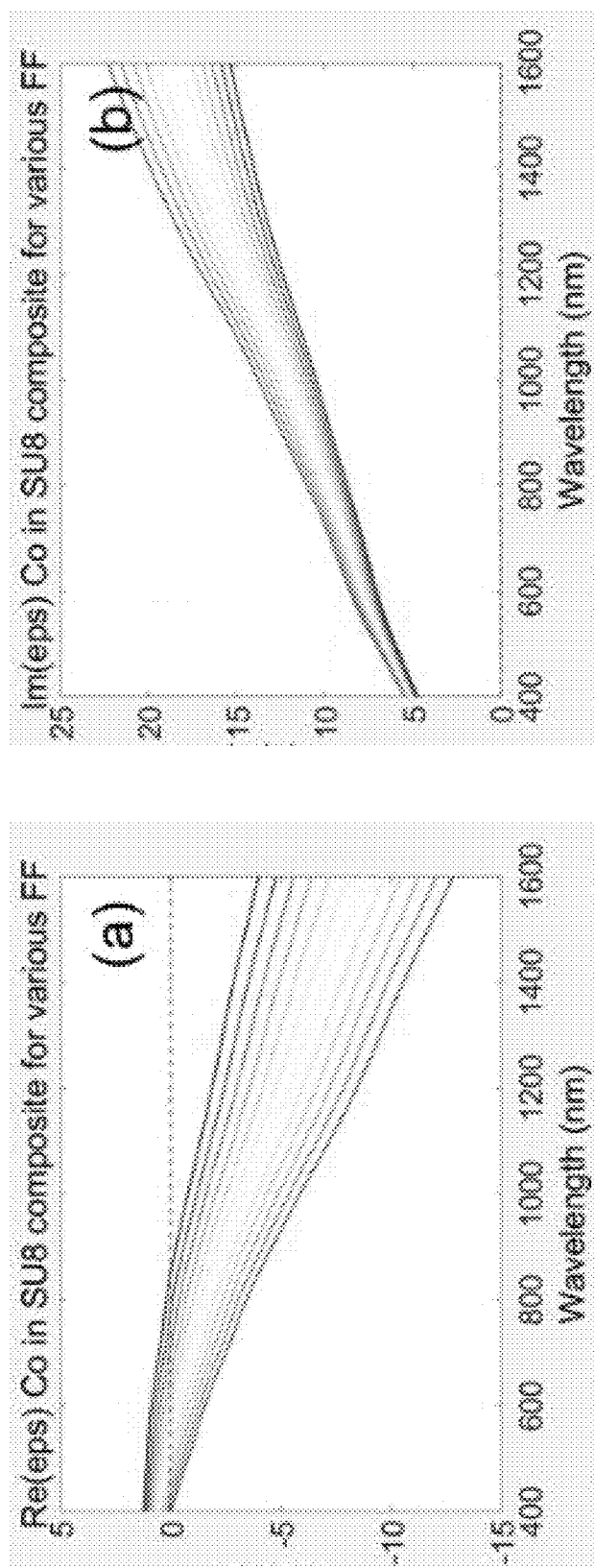
FIG. 4A shows the effective permittivity of an optical film comprising cobalt nanoparticles embedded in an SU8 polymer, according to one embodiment.

Because the substrate and the nanoparticles have different optical properties, different fill factors can result in different effective permittivity of the optical film. FIG. 4A shows the effective permittivity of an optical film comprising cobalt nanoparticles embedded in an SU8 polymer, according to one embodiment. Note that SU8 polymer is a commonly used epoxy-based negative photoresist. The SU8 polymer can include Bisphenol A Novolac epoxy that is dissolved in an organic solvent (gamma-butyrolactone GBL or cyclopentanone) and up to 10 wt % of mixed Triarylsulfonium/hexafluoroantimonate salt as the photoacid generator.

The left drawing of FIG. 4A shows the real portion of the permittivity and the right drawing shows the imaginary portion of the permittivity. The different curves represent different fill factors. For example, the top curve in the left drawing and the bottom curve in the right drawing are for a fill factor of 50%, and the bottom curve in the left drawing and the top curve in the right drawing are for a fill factor of 61%.

Figure 4B:
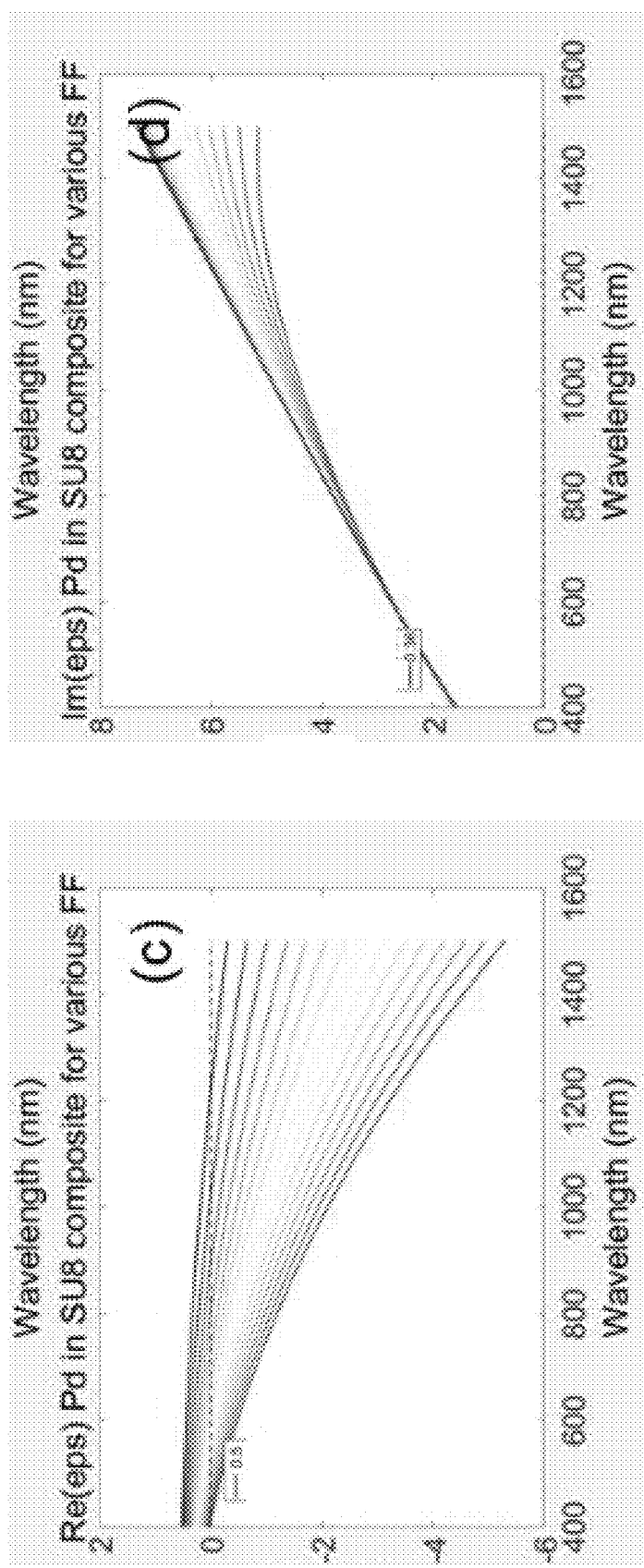
FIG. 4B shows the effective permittivity of an optical film comprising palladium nanoparticles embedded in an SU8 polymer, according to one embodiment.

FIG. 4B shows the effective permittivity of an optical film comprising palladium nanoparticles embedded in an SU8 polymer, according to one embodiment. Similar to FIG. 4A, the left and right drawings show the real and imaginary portions, respectively. In FIG. 4B, the top curve in both drawings represents a fill factor of 36%, and the bottom curve in both drawings represents a fill factor of 50%

Figure 5A:
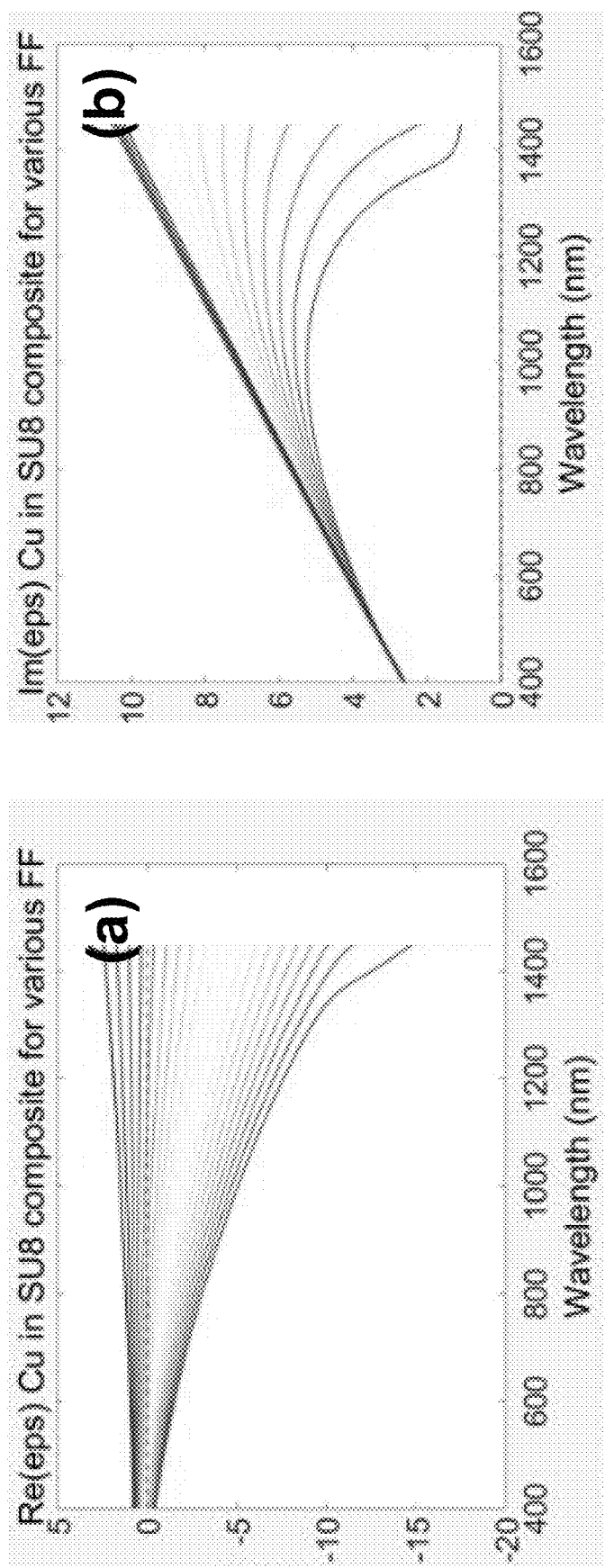
FIG. 5A shows the effective permittivity of an optical film comprising copper nanoparticles embedded in an SU8 polymer, according to one embodiment.
Figure 5B:
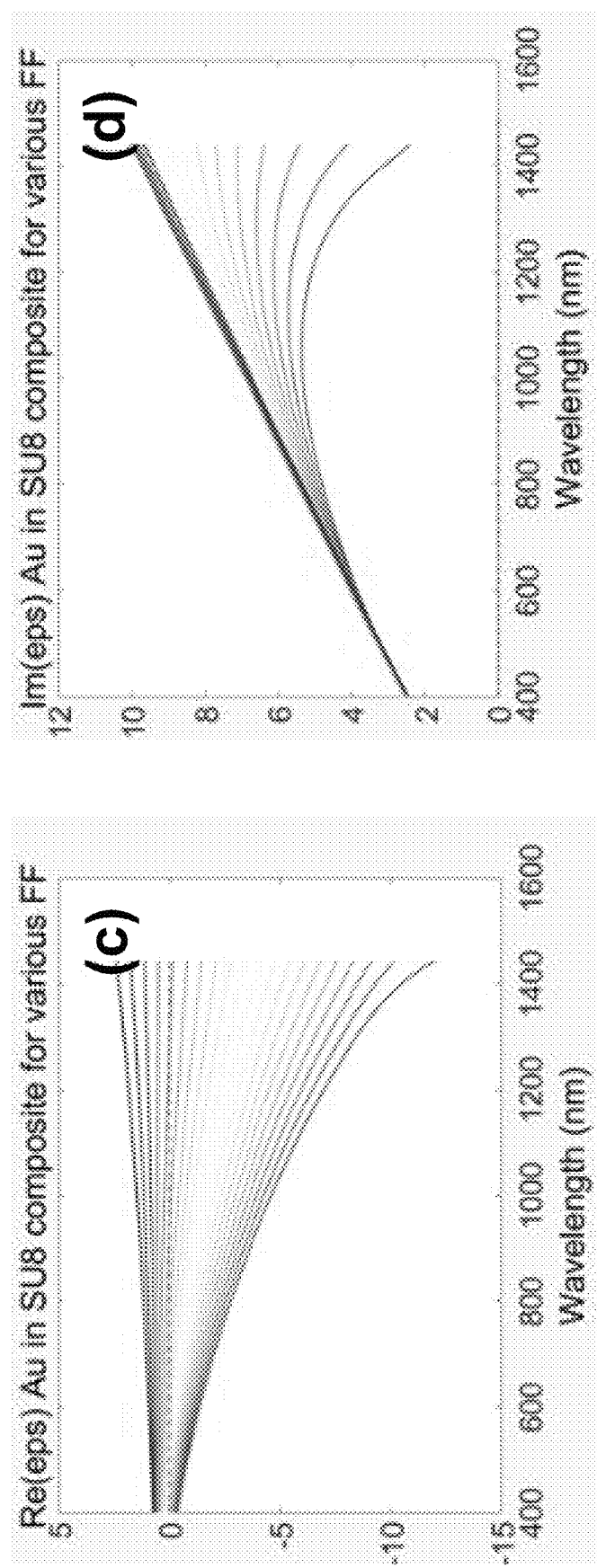
FIG. 5B shows the effective permittivity of an optical film comprising gold nanoparticles embedded in an SU8 polymer, according to one embodiment.
Figure 6A:
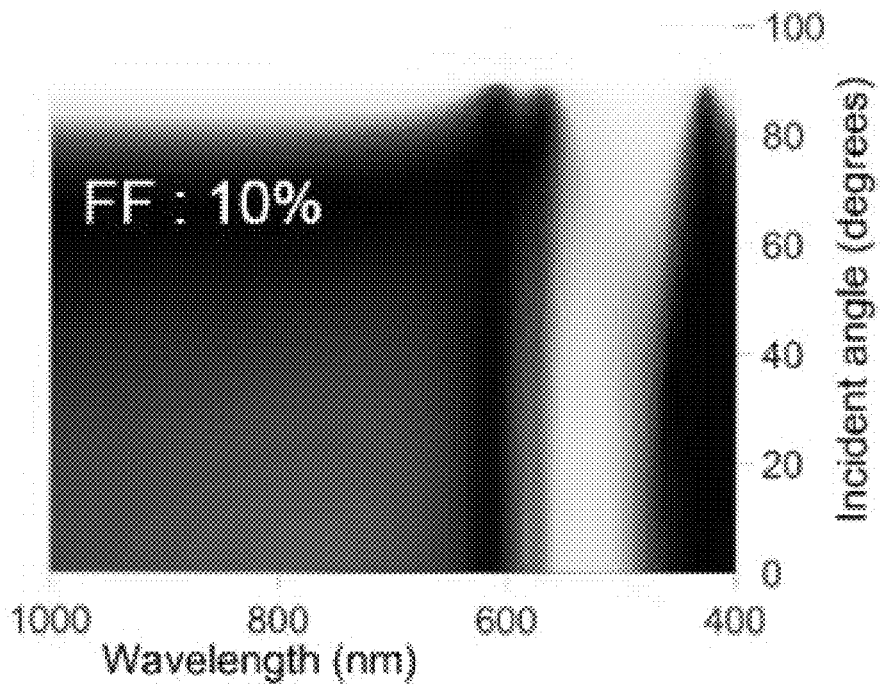
FIGS. 6A, 6B, 6C and 6D show the Fresnel coefficient of reflection of an optical film having a fill factor of 10%, 30%, 60%, and 80%, respectively, as a function of wavelength and incipient angle, according to one embodiment.
Figure 6B:
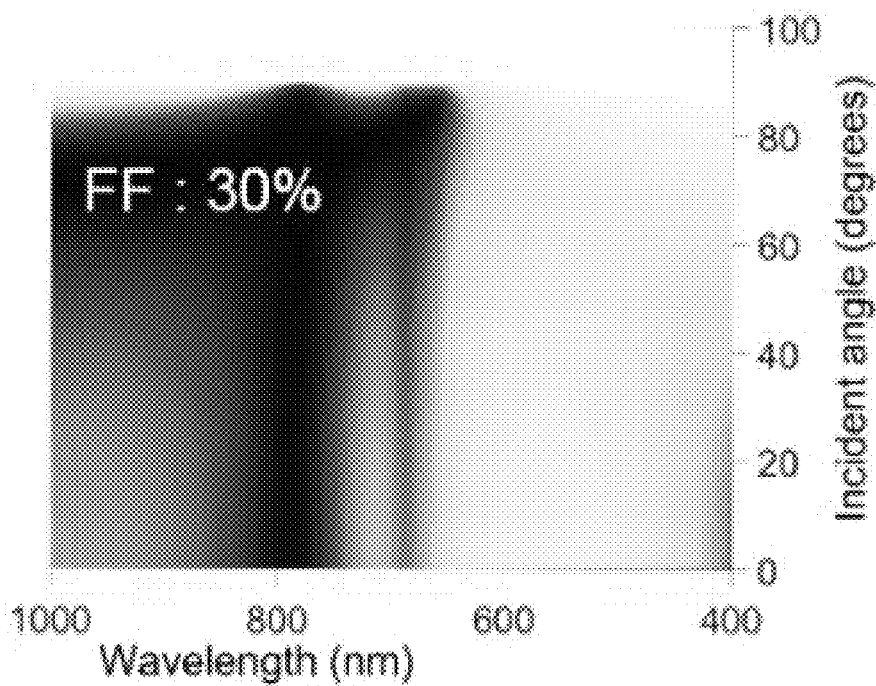
Figure 6C:
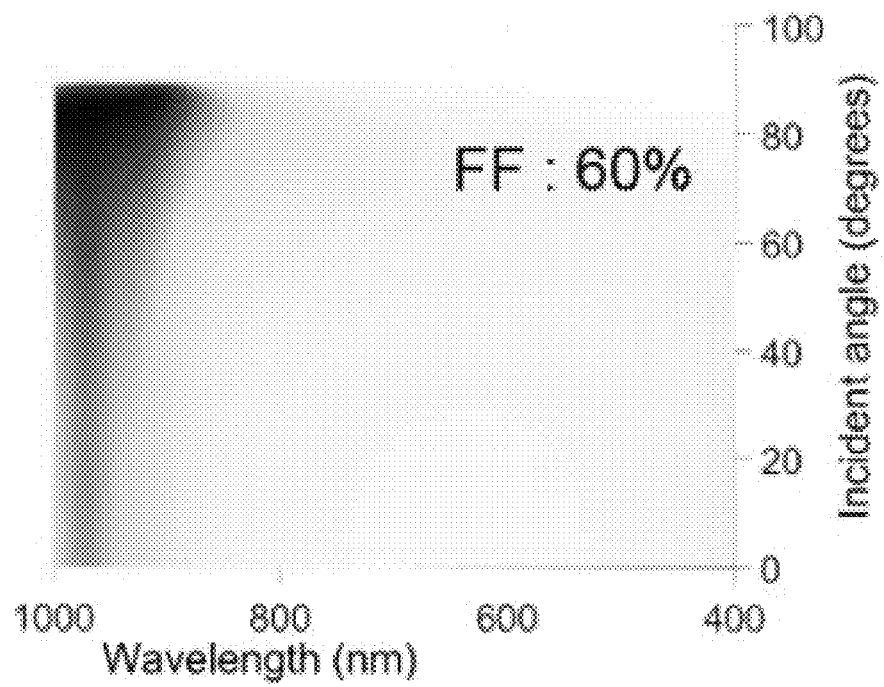
Figure 6D:
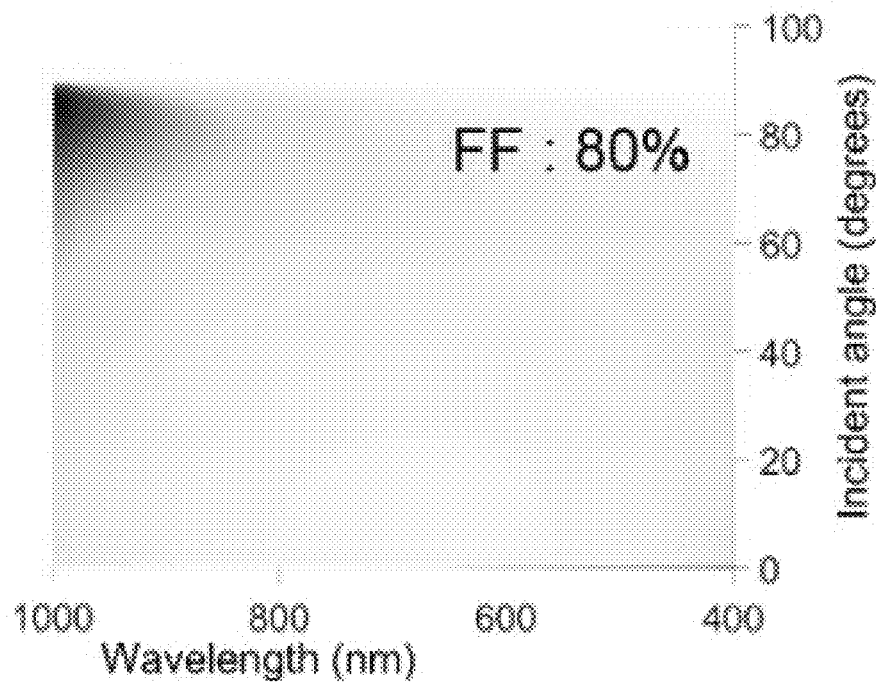

FIG. 5A shows the effective permittivity of an optical film comprising copper nanoparticles embedded in an SU8 polymer, according to one embodiment. The top curve in both drawings represents a fill factor of 31%, and the bottom curve in both drawings represents a fill factor of 50%. FIG. 5B shows the effective permittivity of an optical film comprising gold nanoparticles embedded in an SU8 polymer, according to one embodiment. The top curve in both drawings represents a fill factor of 31%, and the bottom curve in both drawings represents a fill factor of 50%. As one can see from FIGS. 4A-5B, a relatively small change in fill factor (e.g., about 5%) can result in a significant change in the permittivity, especially for longer wavelengths.

In the examples shown in FIGS. 4A-5B, the thickness of the SU8 polymer can be around 100 nm. SU8 polymer is chosen as the substrate due to its large coefficient of thermal expansion (CTE). For example, the CTE of SU8 polymer can be between a few tens and one hundred $10^{-6}$/K. Another attractive feature of the SU8 polymer is its near transparent appearance. The metallic material for the nanoparticles is chosen for its inherent reflective properties (which can be determined by the plasma resonance frequency). For example if it is desirable to reflect or absorb certain wavelengths (e.g., visible (VIS) or infrared (IR) light), a certain type of material can also be chosen. Moreover, the size of the nanoparticles can be also chosen based on the desired transmission or reflection wavelengths. In some embodiments, the size of the nanoparticles can be between 10 and 200 nm, preferable between 30 and 50 nm.

The modulated permittivity can result in modulated reflection or transmission. FIGS. 6A, 6B, 6C and 6D show the Fresnel coefficient of reflection of an optical film having a fill factor of 10%, 30%, 60%, and 80%, respectively, as a function of wavelength and incipient angle, according to one embodiment. In this example, the optical film can include a substrate made of SU8 polymer and embedded tungsten nanoparticles. The thickness of the SU8 substrate can be around 100 nm.

In FIGS. 6A-6D, the x-axis represents the wavelength, the y-axis represents the incident angle, and the color represents the Fresnel coefficient of reflection of the optical film. More specifically, the darker color (e.g., black) indicates a low (e.g., around 0) Fresnel coefficient of the reflection, whereas the brighter color (e.g., white or bright yellow) indicates a high (e.g., around 1) Fresnel coefficient of the reflection.

As one can see from FIGS. 6A-6D, as the fill factor increases, the overall bandwidth of the reflected light increases significantly. For example, when the fill factor increases from 10% to 80%, the overall bandwidth of the reflected light has increased from less than 100 nm to more than 600 nm. At 80% fill factor, the spectrum of the reflected light covers the entire visible (VIS) spectrum and some infrared (IR) spectrum. Although the fill factor is less likely to change from 10% to 80% in real life, even a small change (e.g., from 10% to 30% or from 60% to 80%) in fill factor can still result in a significant change in the reflection spectrum.

Figure 7A:
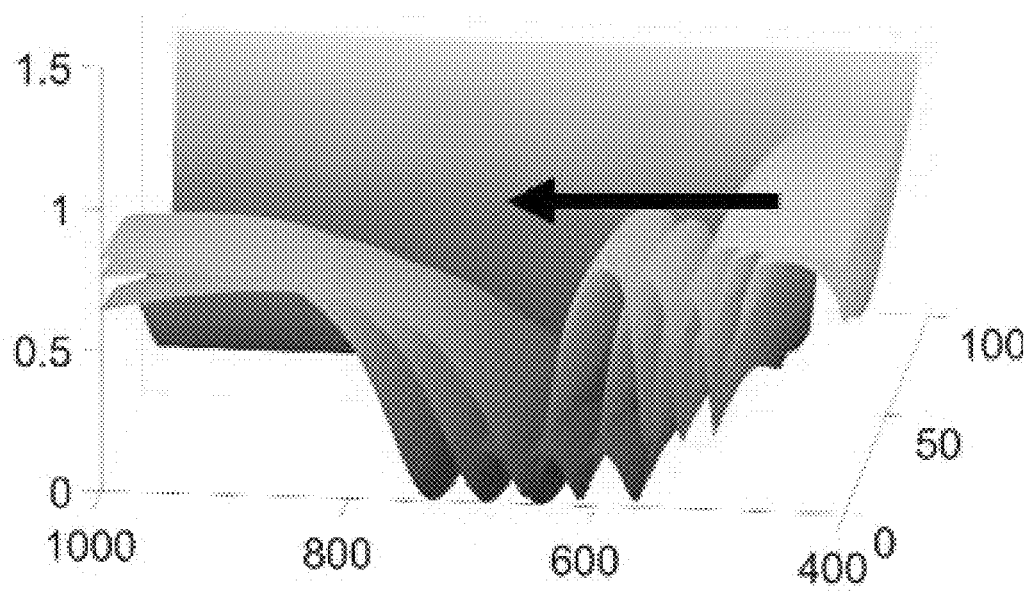
FIGS. 7A and 7B show the Fresnel coefficient of reflection and transmission, respectively, as a function of wavelength and incipient angle, of an optical film for p-polarized light, according to one embodiment.
Figure 7B:
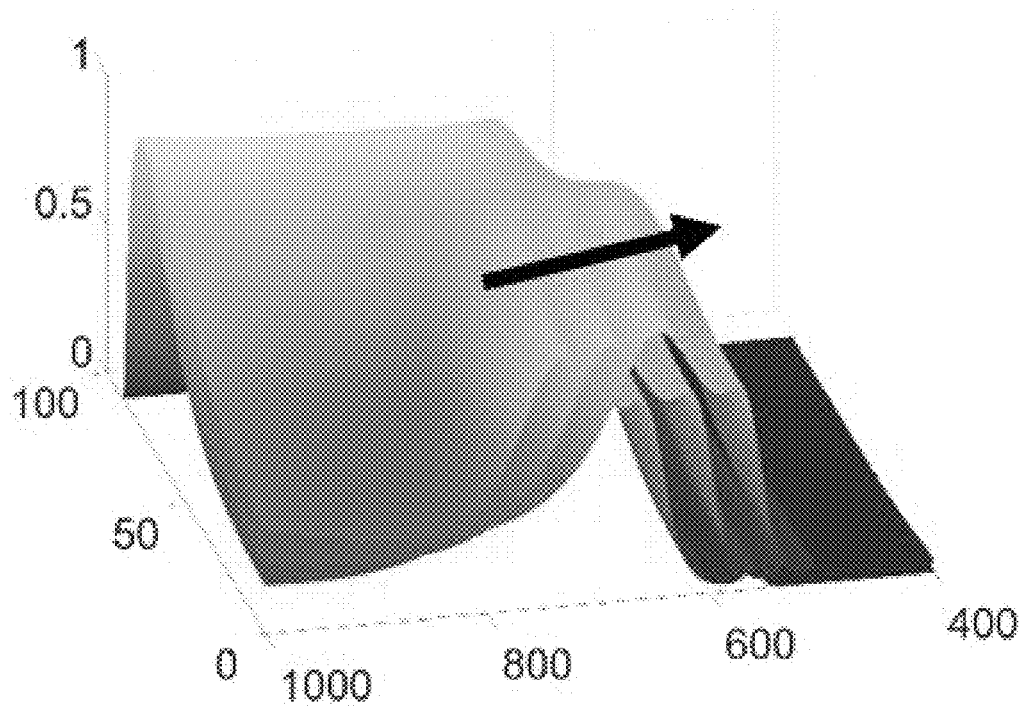

FIGS. 7A and 7B show the Fresnel coefficient of reflection and transmission, respectively, as a function of wavelength and incipient angle, of an optical film for p-polarized light, according to one embodiment. In this example, the optical film includes an SU8 substrate having a thickness of around 100 nm and silver nanoparticles embedded in the SU8 substrate. In FIG. 7A, the x-axis indicates the wavelength, the y-axis indicates the incident angle, and the z-axis indicates the Fresnel coefficient of reflection. Similarly, in FIG. 7B, the x-axis indicates the wavelength, the y-axis indicates the incident angle, and the z-axis indicates the Fresnel coefficient of transmission. As one can see, each drawing includes multiple 3D surfaces, which correspond to different fill factors. More specifically, the arrows in both drawings indicate the direction of shift of the peaks along with the increasing fill factors. In other words, in FIG. 7A, as the fill factor increases, the reflection peaks shift to the left, toward longer wavelengths. On the other hand, in FIG. 7B, as the fill factor increases, the transmission peaks shift to the right, toward shorter wavelengths.

Figure 8A:
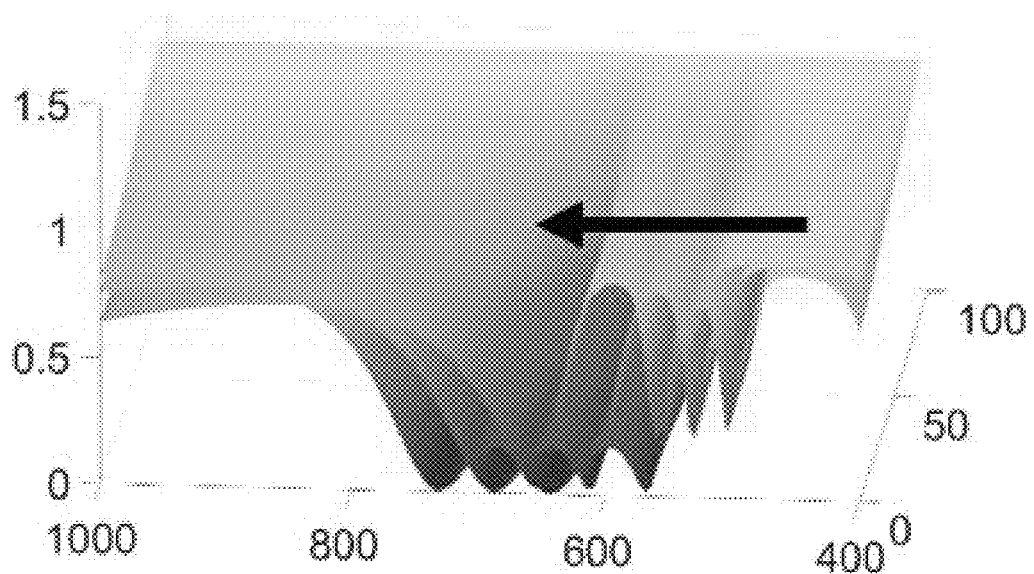
FIGS. 8A and 8B show the Fresnel coefficient of reflection and transmission, respectively, as a function of wavelength and incipient angle, of an optical film for p-polarized light, according to one embodiment.
Figure 8B:
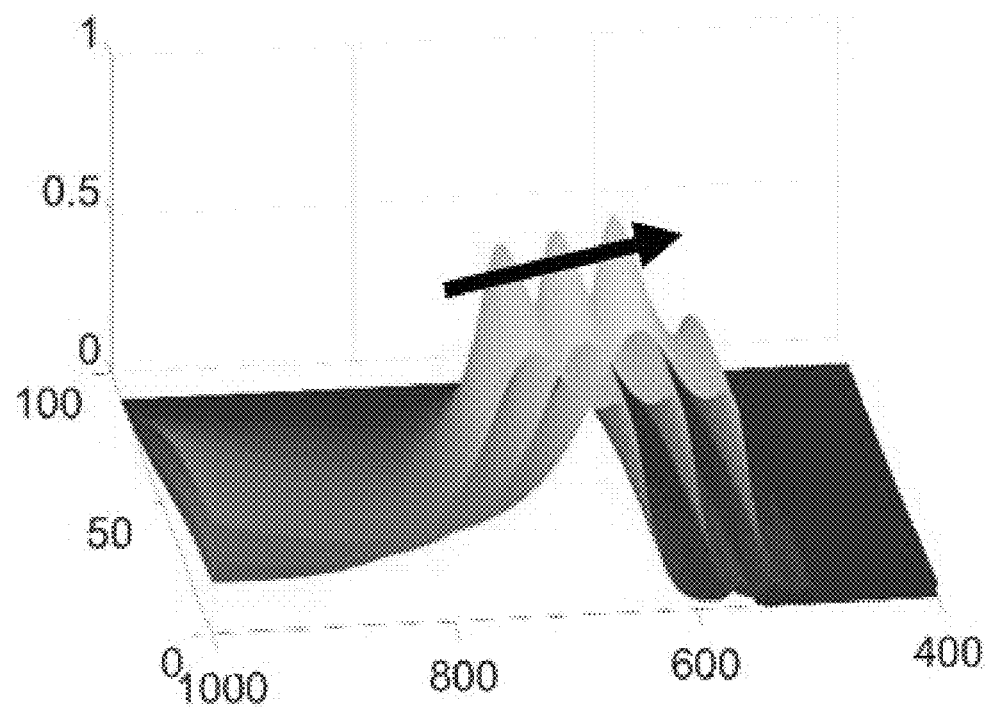

A similar trend can be observed for s-polarized light. FIGS. 8A and 8B show the Fresnel coefficient of reflection and transmission, respectively, as a function of wavelength and incipient angle, of an optical film for s-polarized light, according to one embodiment. The optical film used to obtain FIGS. 8A-8B can be similar to the one used to obtain FIGS. 7A-7B.

Figures 9A, 9B:
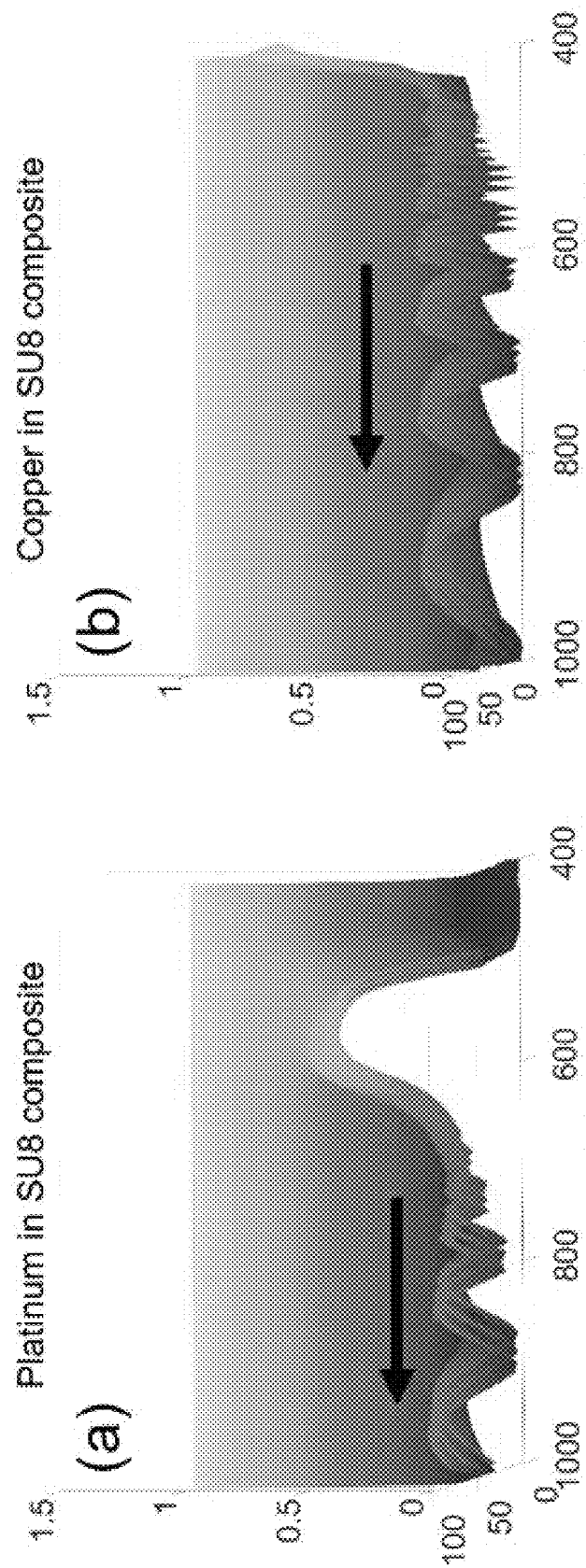
FIG. 9A shows the Fresnel coefficient of reflection as a function of wavelength and incipient angle, according to one embodiment.
FIG. 9B shows the Fresnel coefficient of transmission as a function of wavelength and incipient angle, according to one embodiment.

In the examples shown in FIGS. 7A-8B, the optical film is relatively thin (around 100 nm). Similar trends can be observed for thicker films. FIG. 9A shows the Fresnel coefficient of reflection as a function of wavelength and incipient angle, according to one embodiment. In FIG. 9A, the substrate can be a layer of SU8 polymer having a thickness of around 1000 nm, and the embedded nanoparticles can include platinum particles. FIG. 9B shows the Fresnel coefficient of transmission as a function of wavelength and incipient angle, according to one embodiment. In FIG. 9B, the substrate can be a layer of SU8 polymer having a thickness of around 1000 nm, and the embedded nanoparticles can include copper particles. From FIGS. 9A-9B, one can observe a similar, although smaller, trend of changes in the Fresnel coefficient of reflection along with the changing fill factor. Note that, when the thickness of the optical film is larger than the VIS or IR wavelength, one needs to consider multiple reflections and interferences of lights.

In the aforementioned examples, the optical film can become more reflective to visible and IR light (or the reflective peaks shift toward IR) when the fill factor increases. This can be due to the optical properties of the metallic nanoparticles. If materials chosen for the substrate and the embedded nanoparticles are different from the examples shown in FIGS. 4A-9B, the optical properties of the meta-material optical film may change differently as the fill factor changes. In some embodiments, the substrate may be made of a metallic material (e.g., Ni or Au), whereas the embedded nanoparticles can be dielectric (e.g., PVDF or PTFE). In such scenarios, the increasing fill factor may result in decreasing reflectivity in the VIS and IR wavelengths. Other combinations of material in the meta-material system can also be possible.

Self-Adjusting Optical Coating for Temperature Control

The examples in the previous section demonstrate that by modulating the fill factor of the optical film one can achieve modulated reflection or transmission spectrum. Note that modulating the reflection or transmission spectrum of an optical coating deposited onto an object can have the effect of modulating the amount of heat being transferred onto the object. For example, if the object is exposed to longer wavelength light (e.g., IR or near IR), by modulating the reflection spectrum of the optical coating such that the optical coating can reflect most of the IR or near IR light, one can ensure only a small amount of heat being transferred to the object. Such a property can be used in providing low-cost temperature control.

Different approaches can be used for adjusting the fill factor in an optical coating. In some embodiments, the fill factor of the nanoparticle-embedded optical coating can be modulated by temperature. More particularly, because the substrate and the nanoparticles typically have different coefficients of thermal expansion (CTEs), when temperature changes, they experience different amounts of expansion or contraction, resulting in changes in the fill factor. More particularly, by choosing the substrate and the nanoparticles in such a way that the difference in their CTEs can be relatively large, one can excite a significant change in the fill factor, which in turn can cause a significant change in the reflection property of the optical film.

Figure 10A:
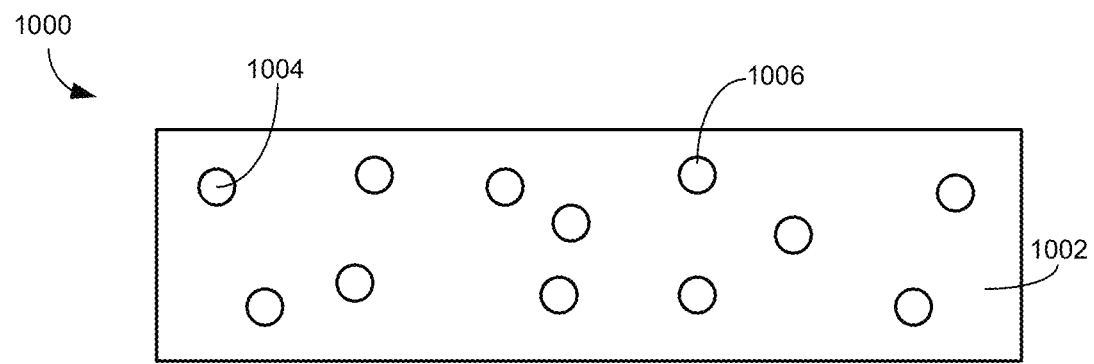
FIG. 10A shows an optical coating at room temperature, according to one embodiment.
Figure 10B:
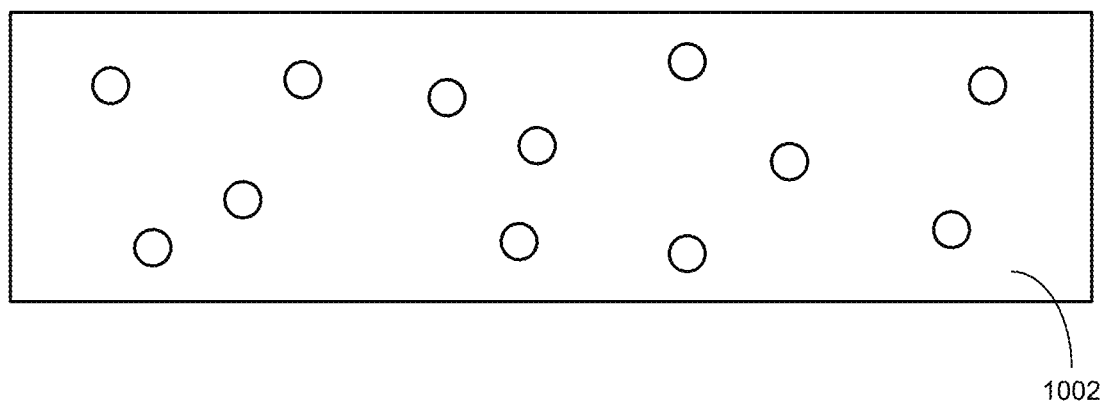
FIG. 10B shows the same optical coating at a raised temperature, according to one embodiment.

FIG. 10A shows an optical coating at room temperature, according to one embodiment. In FIG. 10A, optical coating 1000 can include a dielectric substrate 1002 embedded with metallic nanoparticles (e.g., nanoparticles 1004 and 1006). In this example, dielectric substrate 1002 can have a large CTE (e.g., around 100 $10^{-6}$/K), and the metallic nanoparticles can have a small CTE (e.g., around 10 $10^{-6}$/K). FIG. 10B shows the same optical coating at a raised temperature, according to one embodiment. By comparing FIG. 10A with FIG. 10B, one can see that the volume of dielectric substrate 1002 increases significantly as the temperature increases, whereas the volume of each metallic nanoparticle (e.g., nanoparticle 1004 or 1006) barely increases, resulting in the nanoparticles being dispersed more scarcely in substrate 1002. Note that FIGS. 10A-10B are drawn for illustration purposes only and are not drawn to scale. In some embodiments, to ensure that a significant change of fill factor can be achieved, the difference in CTE between the substrate and the embedded nanoparticles should be at least 100%. In other words, the larger CTE is at least twice as large as the smaller CTE. In the example shown in FIG. 10A, the CTE of dielectric substrate 1002 is roughly 10 times that of the nanoparticles.

By choosing appropriate materials to built the meta-material system (e.g., thin film with embedded particles), one can achieve an optical coating having temperature-dependent optical properties. Moreover, because the reflection and/or transmission properties of the meta-material system can in turn affect the amount of heat being reflected or transmitted by the meta-material system, self-adjusting temperature control can be achieved. For example, if the substrate has a negative CTE and the embedded nanoparticles have a positive CTE, a rising temperature can lead to an increasing fill factor, thus leading to an increased reflectivity of the visible/IR light. Similarly, a falling temperature can lead to a decreasing fill factor and a decreased reflectivity.

Figure 11:
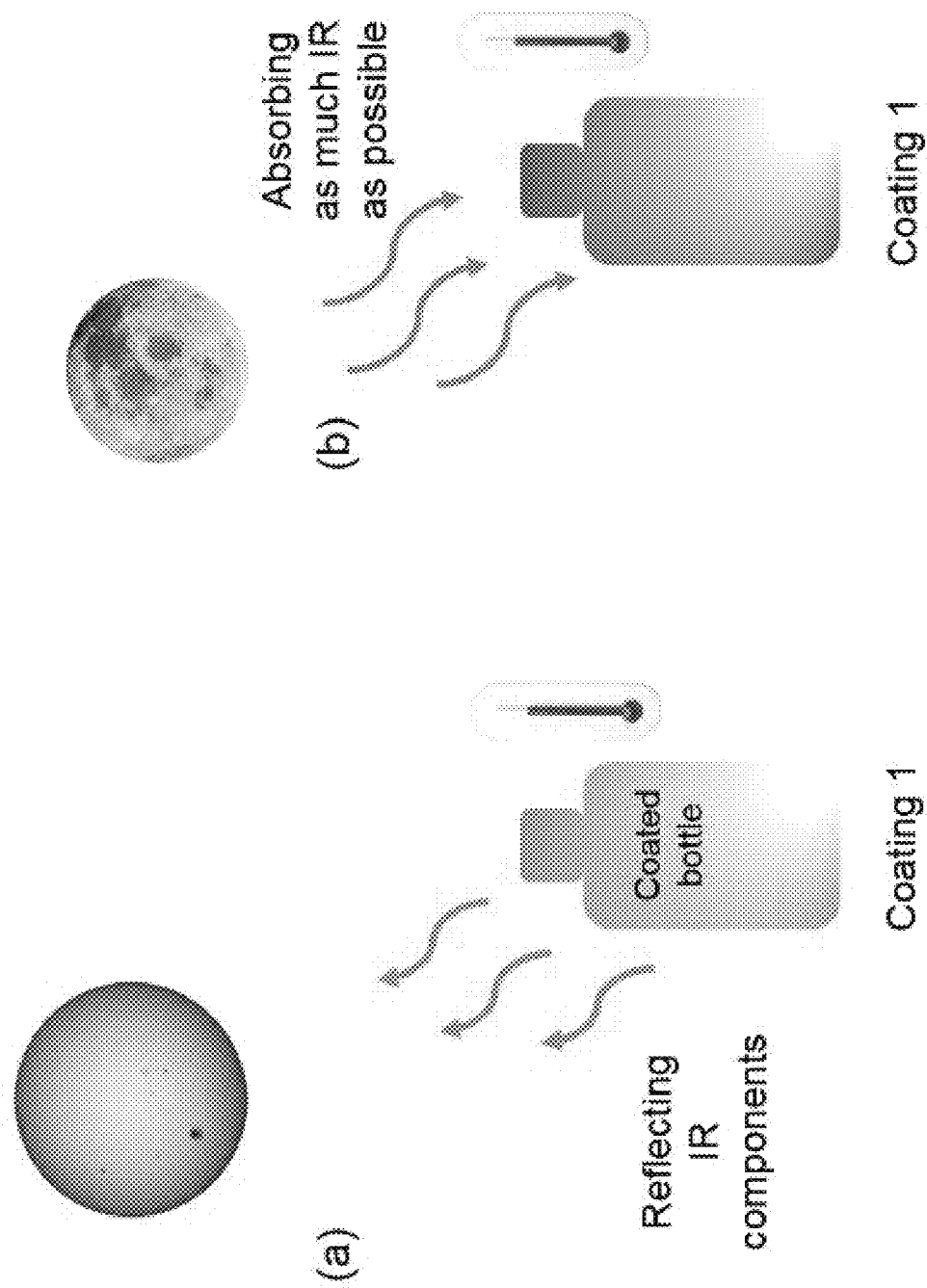
FIG. 11 illustrates the concept of a temperature control scheme via self-adjusting optical coating, according to one embodiment.

FIG. 11 illustrates the concept of a temperature control scheme via self-adjusting optical coating, according to one embodiment. The left drawing shows that a container coated with a layer of self-adjusting optical coating can be exposed to the sun on a hot day. The relatively high temperature in the environment causes the optical coating to have a high reflectivity to most of the visible and IR light, thus preventing a sufficient amount of heat from entering the container. On the other hand, as shown in the right drawing, during nighttime, temperature drops, shifting the light reflection spectrum of the self-adjusting optical coating such that the optical coating has a high transmission rate for the IR light, thus allowing the optical coating to absorb as much IR emission from the environment as possible. This way, the contents of the container can be kept at a substantially constant temperature.

In a different example where the substrate has a positive and larger CTE than that of the nanoparticles (e.g., as shown in FIG. 10), an increased temperature can lead to a decreased reflectivity and a decreased temperature can lead to an increased reflectivity. Such an optical film may be used to cover the interior wall of an air-conditioned office building. During the day, the outside air is hot, and the air conditioning is working to keep the rooms at a low temperature. Consequently, the optical film can be more reflective to keep the rooms cool. During the night, the outside air is cooler, and the air conditioning is turned off. As temperature rises, the optical film becomes less reflective, allowing heat in the rooms to transmit outside.

Compared to other active temperature regulation mechanisms, the self-adjusting optical coating can be much cheaper and, hence, can find application in many areas. For example, such optical coatings can be applied onto containers that hold life-saving vaccines to be sent to developing countries where low-cost temperature control is critically needed. Moreover, such optical coatings can also be used as paint for buildings or vehicles, thus improving energy efficiency for heating/cooling those buildings or vehicles.

Various approaches can be used to fabricate and apply such optical coatings. In some embodiments, the nanoparticles can be suspended within the uncured polymer, and the mixture can be coated onto an object using a standard coating technique, such as spray painting, curtain coating, or spin coating.

Figure 12:
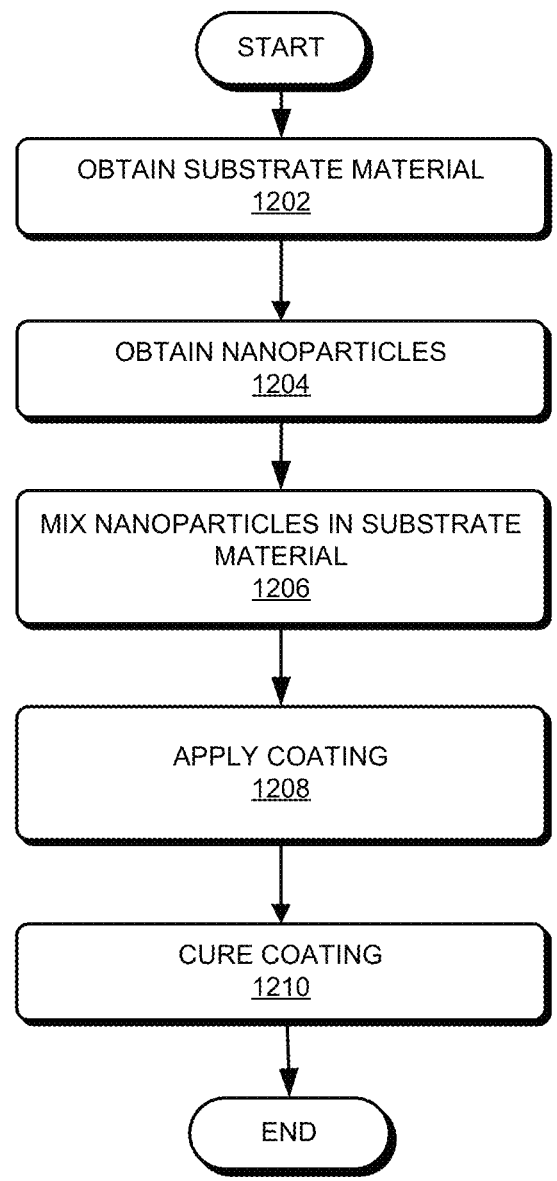
FIG. 12 presents a flowchart illustrating an exemplary process for applying a self-adjusting optical coating, according to one embodiment.

FIG. 12 presents a flowchart illustrating an exemplary process for applying a self-adjusting optical coating, according to one embodiment. During fabrication, one can obtain the material used for forming the substrate (operation 1202) and the nanoparticles (operation 1204). In some embodiments, the substrate material can be in the form of a resin and the nanoparticles can be metallic nanoparticles of various shapes and sizes, depending on the need.

The nanoparticles and the substrate material can be mixed together (operation 1206). In some embodiments, the nanoparticles can be dispersed (e.g., suspended) in the substrate material substantially in a uniform but random way. The mixture of the substrate material and the nanoparticles can then be applied onto the surface of the to-be-coated object (operation 1208). Various techniques can be used to apply the coating, including but not limited to: spray painting, curtain coating, spin coating, etc.

The optical coating can then be cured (operation 1210). Depending on the material chosen for the substrate, the optical coating can be cured using various techniques, such as ultraviolet (UV) curing, heat curing, air curing, etc.

In general, embodiments of the present invention provide a meta-material system that includes a host system and an inclusion system embedded in the host system. Because the host and inclusion systems respond differently to an external stimulation (e.g., an externally driven mechanism), at least one effective physical property of the meta-material system can be modulated by the external stimulation. The modulated physical property of the meta-material system can in turn mitigate or augment an external perturbation, thus achieving self-regulation of the external perturbation.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A meta-material system, comprising:
    a host system; and
    an inclusion system embedded within the host system;
    wherein at least one effective physical property of the meta-material system is modulated by an external stimulation, which changes at least a fill factor indicating a ratio of a volume of the embedded inclusion system to a volume of the host system, thereby facilitating the meta-material system to self regulate an external perturbation.

2. The meta-material system of claim 1, wherein the at least one effective physical property includes one or more of:
    an optical property;
    a mechanical property;
    a thermal property;
    an acoustic property;
    a magnetic property; and
    an electrical property.

3. The meta-material system of claim 1, wherein the inclusion system is embedded in the host system:
    in a layered form; or
    in a form of microparticles or nanoparticles.

4. The meta-material system of claim 1, wherein the external stimulation includes one or more of: a thermal modulation, an electrical modulation, a magnetic modulation, an acoustic modulation, a hydrophobic or hygroscopic modulation, and a pH-driven modulation.

5. The meta-material system of claim 1, wherein the host system includes one or more of: a dielectric material, a metallic material, and a polymeric material.

6. An optical coating that has temperature-dependent optical properties, comprising:
    a substrate having a first coefficient of thermal expansion (CTE); and
    a plurality of nanoparticles/microparticles embedded within the substrate, wherein the nanoparticles have a second CTE;
    wherein the second CTE is different from the first CTE in such a way that a change in temperature results in a change of a fill factor indicating a ratio of a total volume of the nanoparticles/microparticles to a total volume of the substrate, thereby facilitating changes in the optical properties of the optical coating.

7. The optical coating of claim 6, wherein the substrate comprises a dielectric polymer.

8. The optical coating of claim 7, wherein the nanoparticles/microparticles comprise metallic nanoparticles/microparticles.

9. The optical coating of claim 8, wherein the nanoparticles/microparticles are made of one or more materials selected from a group consisting of: cobalt, palladium, aluminum, tungsten, titanium, chromium, copper, gold, silver, iron, niobium, and tin.

10. The optical coating of claim 7, wherein the substrate comprises one or more of:
   SU8 polymer;
   polyvinylidene fluoride (PVDF) polymer;
   polyethylene (PE) polymer; and
   polytetrafluoroethylene (PTFE) polymer.

11. The optical coating of claim 6, wherein a thickness of the substrate is between 100 and 5000 nm.

12. The optical coating of claim 6, wherein at least one dimension of the nanoparticles/microparticles is between 10 and 500 nm.

13. The optical coating of claim 6, wherein the fill factor of the nanoparticles is between 10% and 80%.

14. The optical coating of claim 6, wherein the optical properties comprises at least one of:
   an optical reflection spectrum;
   an optical transmission spectrum; and
   an optical absorption spectrum.

15. A self-adjusting temperature-control system, the system comprising:
   a physical object; and
   an optical coating covering at least one surface of the physical object, wherein the optical coating has temperature-dependent optical properties, and wherein the optical coating comprises:
     a substrate having a first coefficient of thermal expansion (CTE); and
     a plurality of nanoparticles/microparticles embedded within the substrate, wherein the nanoparticles/microparticles have a second CTE, wherein the second CTE is different from the first CTE in such a way that a change in temperature results in a change of a fill factor indicating a ratio of a total volume of the nanoparticles/microparticles to a total volume of the substrate, thereby facilitating changes in the optical properties of the optical coating.

16. The self-adjusting temperature-control system of claim 15, wherein the optical properties comprise at least one of:
   an optical reflection spectrum;
   an optical transmission spectrum; and
   an optical absorption spectrum.

17. The self-adjusting temperature-control system of claim 16, wherein the fill factor is designed to change with the temperature in such a way that a rise in temperature results in a peak in the optical reflection spectrum being shifted substantially toward infrared (IR) band, thereby increasing an amount of thermal energies being reflected by the optical coating toward a surrounding environment.

18. The self-adjusting temperature-control system of claim 16, wherein the fill factor is designed to change with the temperature in such a way that a fall in temperature results in a peak in the optical reflection spectrum being shifted substantially away from infrared (IR) band, thereby increasing an amount of thermal energies being transmitted by the optical coating from a surrounding environment to the container.

19. The self-adjusting temperature-control system of claim 15, wherein the fill factor of the nanoparticles/microparticles is between 40% and 80%.

* * * * *